United States Patent
Skaff et al.

(10) Patent No.: US 8,775,424 B2
(45) Date of Patent: Jul. 8, 2014

(54) SYSTEM FOR CREATIVE IMAGE NAVIGATION AND EXPLORATION

(75) Inventors: Sandra Skaff, Grenoble (FR); Luca Marchesotti, Grenoble (FR); Tommaso Colombino, Grenoble (FR); Ana Fucs, Rio de Janeiro (BR); Gabriela Csurka, Crolles (FR); Yanal Wazaefi, Saint-Martin-d'Hères (FR); Marco Bressan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 412 days.

(21) Appl. No.: 12/693,795

(22) Filed: Jan. 26, 2010

(65) Prior Publication Data

US 2011/0184950 A1  Jul. 28, 2011

(51) Int. Cl.
*G06F 17/30* (2006.01)

(52) U.S. Cl.
USPC ............ 707/737; 707/769; 715/810; 382/305

(58) Field of Classification Search
USPC .................. 707/737, 769, 999.003–999.006; 715/810; 382/305
See application file for complete search history.

(56) References Cited

U.S. PATENT DOCUMENTS

| | | | |
|---|---|---|---|
| 5,347,374 A | 9/1994 | Fuss et al. | |
| 5,357,352 A | 10/1994 | Eschbach | |
| 5,363,209 A | 11/1994 | Eschbach et al. | |
| 5,371,615 A | 12/1994 | Eschbach | |
| 5,414,538 A | 5/1995 | Eschbach | |
| 5,450,217 A | 9/1995 | Eschbach et al. | |
| 5,450,502 A | 9/1995 | Eschbach et al. | |
| 5,586,197 A | 12/1996 | Tsujimura et al. | |
| 5,802,214 A | 9/1998 | Eschbach et al. | |
| 5,899,999 A * | 5/1999 | De Bonet | 1/1 |
| 6,121,969 A * | 9/2000 | Jain et al. | 715/850 |
| 7,031,534 B2 | 4/2006 | Buckley | |
| 2003/0012428 A1 | 1/2003 | Syeda-Mahmood | |
| 2003/0021481 A1* | 1/2003 | Kasutani | 382/218 |
| 2005/0055344 A1* | 3/2005 | Liu et al. | 707/3 |
| 2006/0150088 A1* | 7/2006 | Kraft et al. | 715/517 |
| 2006/0164664 A1 | 7/2006 | Lee et al. | |
| 2007/0005356 A1 | 1/2007 | Perronnin | |
| 2007/0258648 A1 | 11/2007 | Perronnin | |
| 2008/0046410 A1* | 2/2008 | Lieb | 707/3 |
| 2008/0046424 A1 | 2/2008 | Horton | |
| 2008/0069456 A1 | 3/2008 | Perronnin | |
| 2008/0118151 A1* | 5/2008 | Bouguet et al. | 382/181 |
| 2008/0240572 A1 | 10/2008 | Hoshii | |

(Continued)

OTHER PUBLICATIONS

U.S. Appl. No. 12/250,248, Marchesotti, et al.

(Continued)

*Primary Examiner* — Syling Yen
(74) *Attorney, Agent, or Firm* — Fay Sharpe LLP

(57) ABSTRACT

A system and method for assisting a user in navigation of an image dataset are disclosed. The method includes receiving a user's text query, retrieving images responsive to the query from an image dataset, providing for receiving the user's selection of a first feature selected from a set of available first features via a graphical user interface, providing for receiving the user's selection of a second feature selected from a set of available second features different from the first features via the graphical user interface, and displaying at least some of the retrieved images on the graphical user interface. The displayed images are arranged, e.g., grouped, according to levels and/or combinations of levels of the user-selected first and second features.

18 Claims, 6 Drawing Sheets

(56) References Cited

U.S. PATENT DOCUMENTS

| | | | |
|---|---|---|---|
| 2008/0278744 | A1 | 11/2008 | Marchesotti et al. |
| 2008/0317358 | A1 | 12/2008 | Bressan et al. |
| 2009/0144033 | A1 | 6/2009 | Liu et al. |
| 2009/0208118 | A1 | 8/2009 | Csurka |
| 2009/0232409 | A1 | 9/2009 | Marchesotti |
| 2009/0254539 | A1* | 10/2009 | Wen et al. ............... 707/5 |
| 2009/0290794 | A1 | 11/2009 | Marchesotti |
| 2009/0290807 | A1 | 11/2009 | Marchesotti |
| 2009/0313239 | A1* | 12/2009 | Wen et al. ............... 707/5 |
| 2010/0014776 | A1 | 1/2010 | Marchesotti |
| 2011/0029860 | A1* | 2/2011 | Ptucha et al. ............ 715/246 |
| 2012/0106859 | A1* | 5/2012 | Cheatle ................... 382/225 |

OTHER PUBLICATIONS

U.S. Appl. No. 12/361,235, de Campos, et al.
Barnard, et al. Matching Words and Pictures, *Journal of Machine Learning Research*, 2003, pp. 1107-1135.
Bartolini, et al. Scenique: A Multimodal Image Retrieval Interface, AVI May 28-30, 2008.
Bletsko, et al. Multimodal classification of multimedia documents: a state of the art, OMNIA 2008.
Bressan, et al. Travel Blog Assistant System (TBAS)—An Example Scenario of How to Enrich Text with Images and Images with Text using Online Multimedia Repositories, VISAPP Workshop on Metadata Mining for Image Understanding, Jan. 22, 2008.
Chen, et al. Hierarchical Browsing and Search of Large Image Databases, IEEE Transactions on Image Processing, vol. 9, No. 3, Mar. 2000.
Chum, et al. Geometric min-Hashing: Finding a (Thick) Needle in a Haystack, CVPR Jun. 21-25, 2009.
U.S. Appl. No. 12/191,579, Csurka, et al.
U.S. Appl. No. 12/400,277, Marchesotti, et al.
Csurka, et al. Visual Categorization with Bags of Keypoints, ECCV Workshop on Statistical Learning in Computer Vision, 2004.
Datta, et al. Algorithmic Inferencing of Aesthetics and Emotion in Natural Images: An Exposition, IEEE International Conference on Image Processing Oct. 12-15, 2008.
Datta, et al. Studying Aesthetics in Photographic Images Using a Computational Approach, European Conference on Computer Vision, 2006.
Davis, et al. Analysis of Human Attractiveness Using Manifold Kernel Regression, *ICIP* 2008.
Fasel, et al. Automatic Facial Expression Analysis: A Survey, Nov. 2002.
Federovskaya, et al. Image Harmony for Consumer Images, IEEE 2008.
Google Image Swirl, http://googlesystem.blodspot.com/2009/11/doodle-image-swirl.html Nov. 17, 2009.
Guillaumin, et al. TagProp: Discriminative Metric Learning in Nearest Neighbor Models for Image Auto-Annotation; INRIA Grenoble, LEAR, LJK, Sep. 2, 2009.
Jacobsen, et al. Brain correlates of aesthetic judgment of beauty, Aug. 1, 2005 (Abstract Only).
Jaffe, et al. Generating Summaries and Visualization for Late Collections of GeoReferenced Photographs, *MIR* 2006.
Jegou, et al. Hamming embedding and weak geometric consistency for large scale image search, Proceedings of the 10$^{th}$ European Conference on Computer Vision: Part I, 2008.
Jeon, et al. Automatic Image Annotation and Retrieval Using Cross-Media Relevance Models, SIGIR 2003.
Joshi, et al. The Story Picturing Engine: Finding Elite Images to Illustrate a Story Using Mutual Reinforcement, MIR 2004.
Ke, et al. The Design of High-Level Features for Photo Quality Assessment, CVPR 2006.
U.S. Appl. No. 12/632,107.
Kentaro, et al. Proposal of Image Retrieval Interface with Image, 2005 (Abstract Only).
Kozma, L. A proactive Interface for Image Retrieval, Master's Thesis, May 15, 2009.
Laaksonen, et al. PicSOM—Self-Organizing Image Retrieval with MPEG-7 Content Descriptors, IEEE Transactions on Neural Networks, vol. 13, No. 4, Jul. 2002.
Li, et al. Image Annotation by Large-Scale Content-based Image Retrieval, *MM* 2006.
Loui, et al. Multidimensional Image Value Assessment and Rating for Automated Albuming and Retrieval, ICIP 2008.
Lowe. Object Recognition From Local Scale-Invariant Features, ICCV, 1999.
Mikolajczyk, et al. A Performance Evaluation of Local Descriptors, Proceedings of the Conference on Computer Vision and Pattern Recognition (CVPR), Jun. 2003.
Monay, et al. PLSA-based Image Auto-Annotation: Constraining the Latent Space, *MM* 2004.
Naaman, et al. Automatic Organization for Digital Photographs with Geographic Coordinates, *JCDL* 2004.
Nakazato, et al. Extending Image Retrieval with Group-Oriented Interface, IEEE International Conference on Multimedia and Expo, 2002.
Ou, et al. A study of colour emotion and colour preference, *COLOR Research and Application*, 29, 2004 (Abstract Only).
Pantic, et al. Expert system for automatic analysis of facial expressions, *Image and Vision Computing*, 2000.
Perronnin, et al. Adapted Vocabularies for Generic Visual Categorization, *ECCV* 2006.
Perronnin, et al. Fisher Kernels on Visual Vocabularies for Image Categorization, IEEE 2007.
U.S. Appl. No. 12/252,531.
Rodden, et al. Does Organisation by Similarity Assist Image Browsing? *SIGCHI*, 2001.
Sahbi, et al. Graph-Cut Transducers for Relevance Feedback in Content Based Image Retrieval, *ICCV* 2007.
Solli, et al. Color Emotions for Image Classification and Retrieval. CGIV and MCS Final Program and Proceedings, 2008.
Wang, et al. AnnoSearch: Image Auto-Annotation by Search, International Conference on Computer Vision and Pattern Recognition (CVPR) Jun. 2006.
Yanulevskaya, et al. Emotional Valence Categorization Using Holistic Image Features, 15th IEEE International Conference on Image Processing, 2008.
Yee, et al. Faceted Metadata for Image Search and Browsing, ACM CHI 2003.
Zhang, et al. EnjoyPhoto—A Vertical Image Search Engine for Enjoying High-Quality Photos, MM 2006.

\* cited by examiner

US 8,775,424 B2

SYSTEM FOR CREATIVE IMAGE NAVIGATION AND EXPLORATION

CROSS REFERENCE TO RELATED PATENTS AND APPLICATIONS

The following co-pending applications, the disclosures of which are incorporated herein in their entireties by reference, are mentioned:

U.S. patent application Ser. No. 12/123,511, filed May 20, 2008, entitled IMPROVING IMAGE VISUALIZATION THROUGH CONTENT-BASED INSETS, by Luca Marchesotti, et al.

U.S. application Ser. No. 12/123,586, filed May 20, 2008, entitled METHOD FOR AUTOMATIC ENHANCEMENT OF IMAGES CONTAINING SNOW, by Luca Marchesotti.

U.S. application Ser. No. 12/175,857, filed Jul. 18, 2008, entitled SYSTEM AND METHOD FOR AUTOMATIC ENHANCEMENT OF SEASCAPE IMAGES, by Luca Marchesotti.

U.S. application Ser. No. 12/191,579, filed on Aug. 14, 2008, entitled SYSTEM AND METHOD FOR OBJECT CLASS LOCALIZATION AND SEMANTIC CLASS BASED IMAGE SEGMENTATION, by Gabriela Csurka, et al.

U.S. application Ser. No. 12/250,248, filed Oct. 13, 2008, entitled IMAGE SUMMARIZATION BY A LEARNING APPROACH, by Luca Marchesotti, et al.

U.S. application Ser. No. 12/361,235, filed Feb. 5, 2009, entitled MODELING IMAGES AS SETS OF WEIGHTED FEATURES, by Teofilo E. de Campos, et al.

U.S. application Ser. No. 12/400,277, filed on Mar. 9, 2009, entitled A FRAMEWORK FOR IMAGE THUMBNAILING BASED ON VISUAL SIMILARITY, by Luca Marchesotti, et al.

U.S. application Ser. No. 12/632,107, filed Dec. 7, 2009, entitled SYSTEM AND METHOD FOR CLASSIFICATION AND SELECTION OF COLOR PALETTES, by Luca Marchesotti.

BACKGROUND

The exemplary embodiment relates to the field of image retrieval and selection. It finds particular application in the context of a navigation system and method for searching a database of images.

Digital images are acquired and stored in large numbers for later use in connection with a variety of applications, such as commercial design, editorial work, professional digital photography, and asset management. Retrieval of images by conventional searching techniques is often time consuming. For example, if a collection has been tagged appropriately, a user may enter a textual query, such as "flower," and retrieve a large number of images responsive to the query, e.g., those which have been manually tagged as containing flowers. Other methods for retrieval are based on feature extraction techniques. For example, an automated system may propagate tags of manually labeled images to unlabeled images based on similarity of extracted features. Or, the user may input an image of a flower and similar images are retrieved automatically by comparing the features of the input image with those of the stored images.

Image searching generally entails a compromise between narrowly defining and delimiting the search space through the use of explicit criteria, and browsing a sufficiently large sample of the available images to ensure that the most suitable or aesthetically appealing ones are not missed. This leaves the user with a relatively large subset of images. Thus, browsing remains the primary method for section of images.

Current systems, such as Google Images™ and FLICKR™ image systems, perform image searches based on content and provide very basic options for aesthetic refinement. However, they do not provide tools for feature combination searches. At best, they allow users to select and chain together a sequence of refinement criteria. For example in Google Images, a user can search by content such as the query "sky" and then click on the "blue" box to get the blue sky images. This type of browsing makes moving back and forth between selected feature refinements and exploration of different combinations of features impractical.

INCORPORATION BY REFERENCE

The following references, the disclosures of which are incorporated herein by reference in their entireties, are mentioned.

U.S. Pub. No. 2007/0005356, entitled GENERIC VISUAL CATEGORIZATION METHOD AND SYSTEM; U.S. Pub. No. 2007/0258648, entitled GENERIC VISUAL CLASSIFICATION WITH GRADIENT COMPONENTS-BASED DIMENSIONALITY ENHANCEMENT; and U.S. Pub. No. 2008/0069456 entitled BAGS OF VISUAL CONTEXT-DEPENDENT WORDS FOR GENERIC VISUAL CATEGORIZATION, all by Florent Perronnin; U.S. application Ser. No. 12/252,531, filed Oct. 16, 2008, entitled MODELING IMAGES AS MIXTURES OF IMAGE MODELS, by Florent Perronnin, et al.; U.S. Pub. No. 2009/0144033, entitled OBJECT COMPARISON, RETRIEVAL, AND CATEGORIZATION METHODS AND APPARATUSES, by Yan Liu, et al., and G. Csurka, C. Dance, L. Fan, J. Willamowski and C. Bray, "Visual Categorization with Bags of Keypoints," ECCV Workshop on Statistical Learning in Computer Vision, 2004, disclose systems and methods for categorizing images based on content.

US Pub. No. 2008/0046424, published Feb. 21, 2008, entitled SYSTEM AND METHOD OF SELECTING IMAGES ACCORDING TO COLOR CONTENT, by R. B. Horton, discloses a method of selecting an image in a database based upon color, including receiving a search color represented in a first color model, calculating a similarity measure for a first plurality of images in the database, wherein color content of the images in the database is represented in the first color model and the similarity measure is based upon a comparison of the search color and the color content of the image, and selecting an image having a similarity measure indicating a greatest similarity between the search color and the color content of the image.

U.S. Pat. No. 5,586,197, issued Dec. 17, 1996, entitled IMAGE SEARCHING METHOD AND APPARATUS THEREOF USING COLOR INFORMATION OF AN INPUT IMAGE, by Tsujimura, et al., discloses a method of searching for a desired image in an image database by using an input color information signal containing a plurality of color components. A similarity between the input color information signal and the plurality of predetermined color information signals is based on a contribution factor of each color component of the color information signals.

US Pub. No. 2008/0046410, published Feb. 21, 2008, entitled COLOR INDEXING AND SEARCHING FOR IMAGES, by Adam Lieb, discloses a method including compiling a database of discreet color values associated with images, searching the database based on a query including color information, and returning results of the searching to the user with associated images.

US Pub. No. 2003/0012428, published Jan. 16, 2003, entitled METHOD AND APPARATUS FOR INDEXING AND RETRIEVING IMAGES FROM AN IMAGE DATABASE BASED ON A COLOR QUERY, by T. F. Syeda-Mahmood, discloses a system and method for retrieving images from an image database with a pre-computed index keyed according to color surface labels. The method includes receiving a semantic query representing at least one color surface label, finding an index entry within the index matching the semantic query, and identifying at least one image containing region corresponding to the at least one color surface label.

US Pub. No. 2006/0164664, published Jul. 27, 2006, entitled COLOR QUANTIZATION AND METHOD THEREOF AND SEARCHING METHOD USING THE SAME, by J. S. Lee, discloses a color quantization method based on a color space which includes dividing the color space into subspaces along a first axis, and quantizing the subspaces by dividing each subspace into at least one sub-region along a second axis and a third axis. The number of sub-regions divided along the second axis and third axis is determined by the number of quantization levels.

U.S. Pub. No. 2009/0208118, published Aug. 20, 2009, entitled CONTEXT DEPENDENT INTELLIGENT THUMBNAIL IMAGES, by Gabriela Csurka, discloses an apparatus and method for context dependent cropping of a source image.

U.S. Pub No. 2009/0232409, published Sep. 17, 2009, entitled AUTOMATIC GENERATION OF A PHOTO GUIDE, by Luca Marchesotti, et al., discloses, for images in a set, identifying image quality and content-related features and generating an image quality guide document for the set of images with thumbnails of the images and text descriptions based on determined content-based degradation of the images.

U.S. Pub. No. 2008/0278744, published Nov. 13, 2008, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al., discloses extracting features from a submitted print job, comparing the extracted features with a predictive model which is based on features extracted from prior print jobs and enhancement operations performed on the prior print jobs, and generating a proposed enhancement operation for the submitted print job based on the comparison.

U.S. Pub. No. 2008/0317358, published Dec. 25, 2008, entitled CLASS-BASED IMAGE ENHANCEMENT SYSTEM, by Marco Bressan, et al., discloses a method including providing for a semantic class to be assigned to a digital image based on image content, the assigned semantic class being selected from a plurality of semantic classes. An aesthetic enhancement is applied to the image based on image quality of the image and the assigned semantic class.

US Pub. No. 2003/0021481, published Jan. 30, 2003, entitled IMAGE RETRIEVAL APPARATUS AND IMAGE RETRIEVING METHOD, by E. Kasutani, discloses an image retrieval apparatus which retrieves an image similar to a predetermined query image from images to be retrieved by using an image feature vector and computed similarity to a second image feature vector.

US Pub. No. 2008/0240572, published Oct. 2, 2008, entitled IMAGE SEARCH APPARATUS AND IMAGE SEARCH METHOD, by J. Hoshii, discloses an image search apparatus that searches stored images. An object setting unit sets objects on a certain region of a screen of the image search apparatus, each object having at least one attribute of shape, size, color, and texture. A feature extraction unit extracts a relative positional relationship between the plural objects and an attribute of the respective object as a feature that is used when searching for stored images. An image extraction unit extracts images having the extracted feature from the plural images stored in the storage.

BRIEF DESCRIPTION

In accordance with one aspect of the exemplary embodiment, a method for assisting a user in navigation of an image dataset is provided. The method includes receiving a user's text query, retrieving images responsive to the text query from an image dataset, providing for receiving the user's selection of a first feature selected from a set of available features, providing for receiving the user's selection of a second feature selected from the set of available features. The method further includes displaying at least some of the retrieved images on the graphical user interface contemporaneously in an arrangement. The arrangement of images reflects different levels of the first feature where only a first feature is selected. The arrangement reflects different combinations of levels of the user-selected first and second features where first and second features are selected.

In another aspect, an apparatus for navigation of an image dataset includes a navigation system comprising instructions stored in memory for: receiving a user's text query, retrieving images responsive to the text query from an associated image dataset, receiving the user's selection of a first feature selected from a set of available features, receiving the user's selection of a second feature selected the set of available features, partitioning the retrieved images into groups based on levels of the selected features, and displaying at least some of the groups of retrieved images on an associated graphical user interface. A processor in communication with the memory executes the instructions.

In another aspect, a method of adding images to a document includes storing a document with at least one place-holder for accepting an image, receiving a user's text query, retrieving images responsive to the text query from an image dataset, each of the images in the dataset being classified according to content and being associated with feature values for each of a set of features. The method further includes receiving the user's selection of first and second features from the set of features, displaying at least some of the retrieved images on the graphical user interface, whereby the displayed images are grouped according to the user-selected first and second features, and providing for the user to select an image from the displayed groups of images for insertion in one of the placeholders.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

The exemplary embodiment relates to a system, apparatus, and method for navigating and searching a database of images. The system, apparatus, and method enable a combination of content-based search techniques with feature-based searching. The features selected may be aesthetic and/or emotional features. In navigating a dataset of images, the system facilitates creation of a search space by allowing a user to select a specific semantic category (e.g., flowers) with a text query and then explore at least a subset of the images in the selected category iteratively, using different combinations of features. In the exemplary embodiment, the user is able to select from a set of features including aesthetic features (light, contrast, blur, color, etc) and emotional features (e.g., appreciation, activity).

Various visualization strategies (clustering, mosaic, etc.) may be provided to users for navigating the image database with different granularities (clusters, near-duplicates exploration, etc.) and for iteratively creating document drafts with appropriate images.

Figure 1:
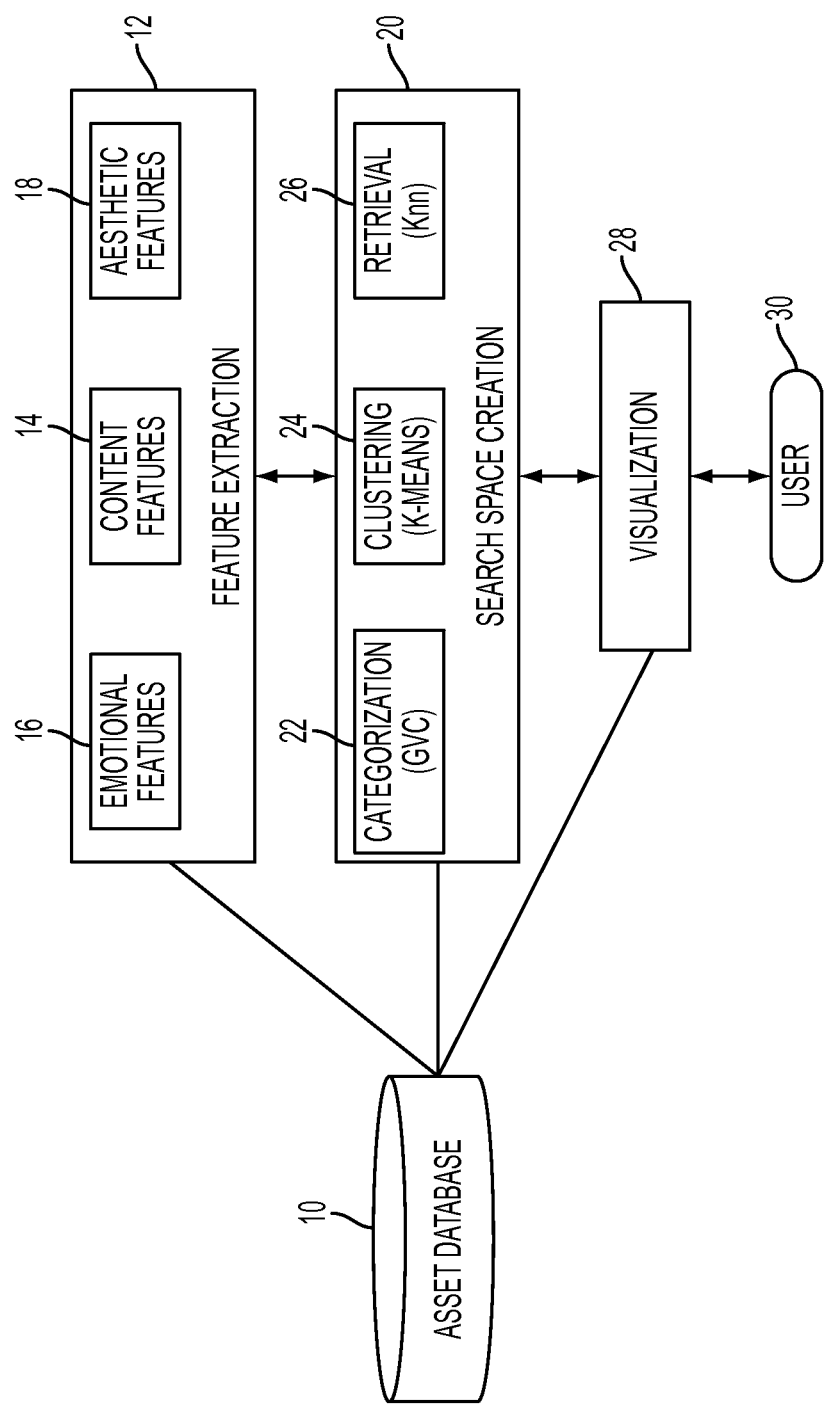
FIG. 1 is a block diagram of an overview of an exemplary system and method for image navigation.

With reference to FIG. 1, an overview of the exemplary system and method is shown. The system and method rely on a database 10 of assets, such as a large collection (e.g., hundreds, thousands, or millions) of images, such as photographic images and/or graphic images. Feature extraction 12 allows selection of images from the database 10, based on one or more of content-based features 14, emotional features 16, and aesthetic features 18. Search space creation 20 takes a subset of images from the database and partitions them in a way which allows images to be clustered and displayed based on combinations of features using one or more of categorization 22, clustering 24, and retrieval 26 methods/components. Visualization 28 generates a display of at least a portion of the image subset for viewing by a user 30.

Figure 2:
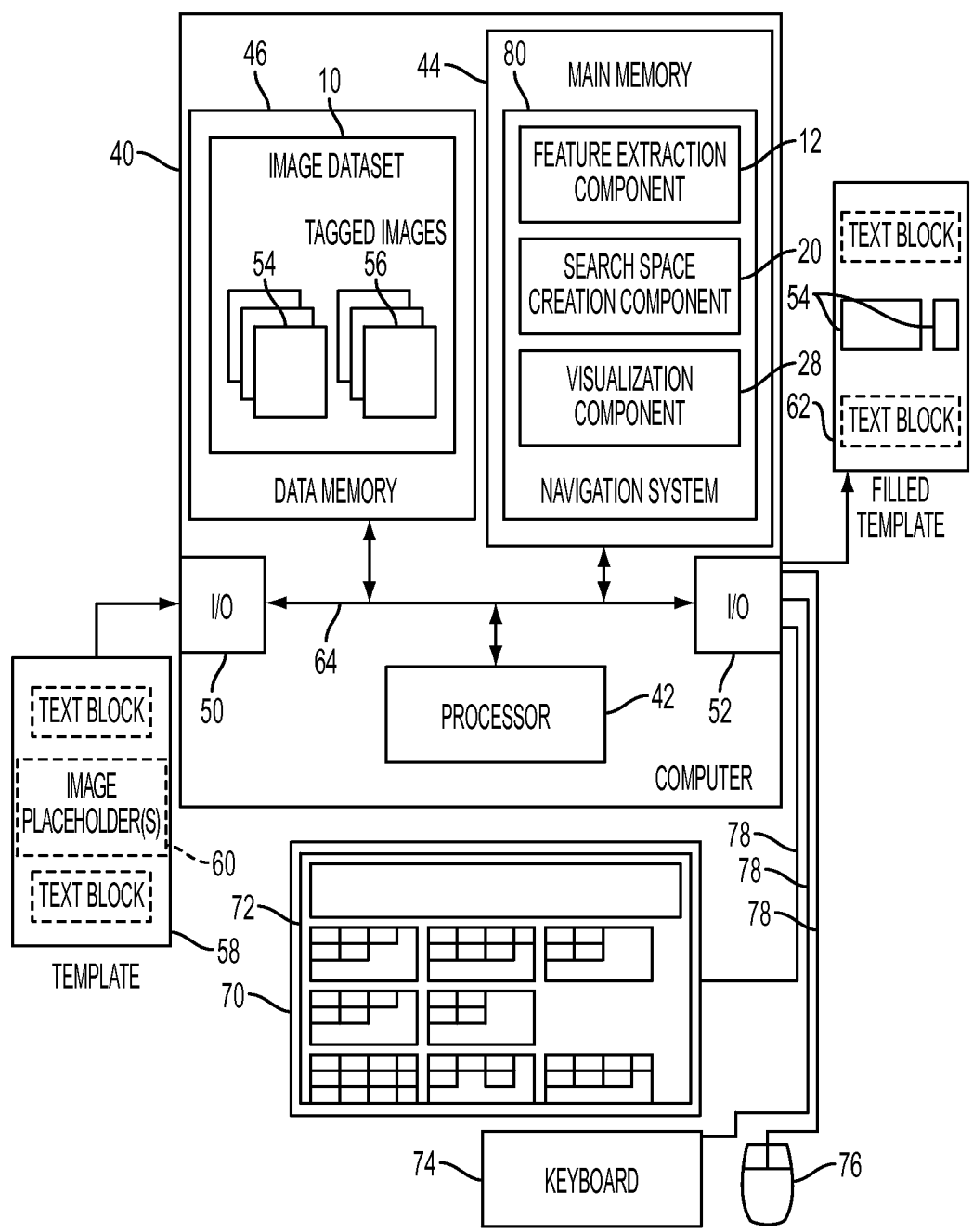
FIG. 2 is a functional block diagram of an image navigation apparatus.

With reference to FIG. 2, one specific embodiment of an apparatus 40 for assisting a user in navigating a dataset of images is illustrated, in the form of a digital processing device, such as a computer. The computer 40 includes a digital processor 42, such as the computer's CPU, and associated memory, here illustrated as main memory 44 and data memory 46.

The illustrated computer 40 includes an input interface 50 and an output interface 52, which may be combined or separate. Interface 50 receives a dataset of electronic data objects 54 (images) which are stored in data memory 46, which serves as the database 10. As will be appreciated, the database 10 may be located remote from the computer 10 and accessed by a suitable communication link. All or a portion 56, of the images 54 in the dataset 10 are labeled with content tags. The content tags may include a user's description of the image content and/or some comments about the image. For example, an image 54 may be tagged with the description "spring flowers" and a comment such as "My cheerful garden in March." In cases where the image is surrounded by text, content tags can be derived from the surrounding text. Auto-tagging methods can be used to propagate tags to unlabeled images.

Images 54 in the database 10 may be in any convenient file format, such as JPEG, TIFF, or the like. Images may be individual images or video images. In general, each digital image includes image data for an array of pixels forming the image. The image data may include colorant values, such as grayscale values, for each of a set of color separations, such as RGB, or be expressed in another color space in which different colors can be represented. In general, "grayscale" refers to the optical density value of any single color channel, however expressed (RGB, YCbCr, etc.).

The interface 50, or a separate interface, may also be configured for receiving a document 58, such as the exemplary template, with a placeholder (space) 60 for accepting one or more images from the database 10.

Interface 52 outputs a modified document 62 to which selected image(s) 54 have been added.

Exemplary input and output interfaces 50, 52 include wired and wireless network interfaces, such as modems, or local interfaces, such as USB ports, disk drives, and the like. Components 42, 44, 46, 50, 52 of the computer are communicatively interconnected by a data/control bus 64.

A graphical user interface (GUI) 70 includes a display screen 72, such as a color monitor or LCD screen, and a user input device, such as a keyboard 74, keypad, touch screen device, cursor control device 76, microphone with associated speech to text converter, or combination thereof, for inputting a text query. The GUI 70 is communicatively linked with the computer 40 via one or more wired or wireless link(s) 78. In the exemplary embodiment, the GUI 70 is local to the computer 40, although in other embodiments, the GUI 70 may be linked to a client computer (not shown) which may, in turn, be linked to computer 40 via a web browser, wired or wireless network, or other communication link.

The digital processor 42 can be variously embodied, such as by a single-core processor, a dual-core processor (or more generally by a multiple-core processor), a digital processor and cooperating math coprocessor, a digital controller, or the like. The computer 40 may include one or more dedicated or general purpose computing devices, such as a server computer, a desktop or laptop computer, palmtop computer, portable digital assistant (PDA), camera, or other computing device capable of executing instructions for performing the exemplary method.

The memories 44, 46 may be separate or combined and may represent any type of computer readable medium such as random access memory (RAM), read only memory (ROM), magnetic disk or tape, optical disk, flash memory, or holographic memory. In one embodiment, the memory 44, 46 comprises a combination of random access memory and read only memory.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The computer 40 is configured by suitable programming and/or hardwired firmware to embody an image navigation system 80. The exemplary navigation system 80 is in the form of software instructions for performing the exemplary method which are stored in memory 44 and executed by the processor 42.

The navigation system 80 includes a features extraction component 12, search space creation component 20, and visualization component 28, each of which may include one or more separate software tools (as illustrated in FIG. 1), or be combined as a single tool.

The features extraction component 12 can process the stored images 54, prior to input of a user's search request. In the exemplary embodiment, a content features extractor 14 (FIG. 1) of the features extraction component 12 includes a classifier (or a set of binary classifiers) which is trained to assign content-based tags (semantic labels) to unlabeled images 54. The training can be based on a training set comprising labeled images (such as the tagged images 56 in the dataset). The labels represent a priori information about the classifications of the images, such as manually applied class labels. For a hard binary classification, the labels can, for example, be "+1" if the object is assigned to a particular class and "−1" otherwise. For a soft binary classification, the labels can, for example, be values in the range [0,1] indicating likelihood of membership in the class. In other embodiments the entire dataset 10 may be tagged with content features, thus avoiding the need for a classifier. Content tags may additionally or alternatively be extracted from text content associated with the image.

The emotional features extractor(s) 16 extracts features associated with emotions from the images and assigns labels to the images corresponding to feature values for each of a set of available emotion features.

The aesthetics features extractor(s) 18 extracts features associated with aesthetics from the images and assigns labels to the images corresponding to feature values for each of a set of available aesthetic features.

Figure 3:
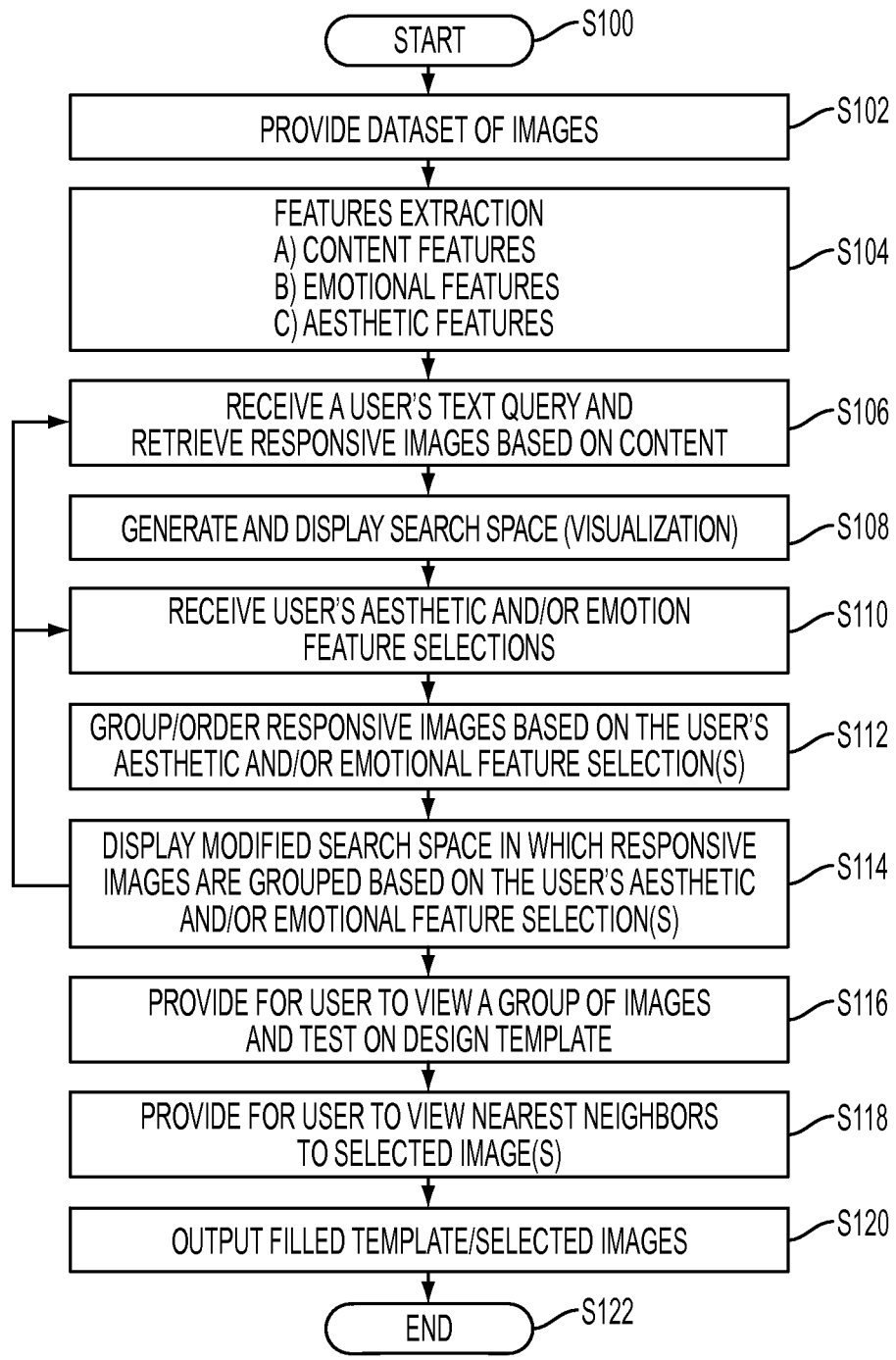
FIG. 3 is a flow chart illustrating a method for assisting a user in image navigation.

With reference to FIG. 3, a computer-implemented method which may be performed with the apparatus of FIG. 2 is shown. The method, details of which are described in greater detail below, begins at S100.

At S102, a dataset 10 of images 54 is input and may be stored in computer memory 46 during processing.

At S104 (Features Extraction), features, such as content, aesthetic, and emotional features, are extracted for each image in the database and stored, e.g., as associated metadata or other tags.

At S106, a user's text query is received, via the GUI 70 and a subset of dataset images responsive to the query, e.g., those tagged with a "content" label corresponding to a query term, are retrieved.

Figure 4:
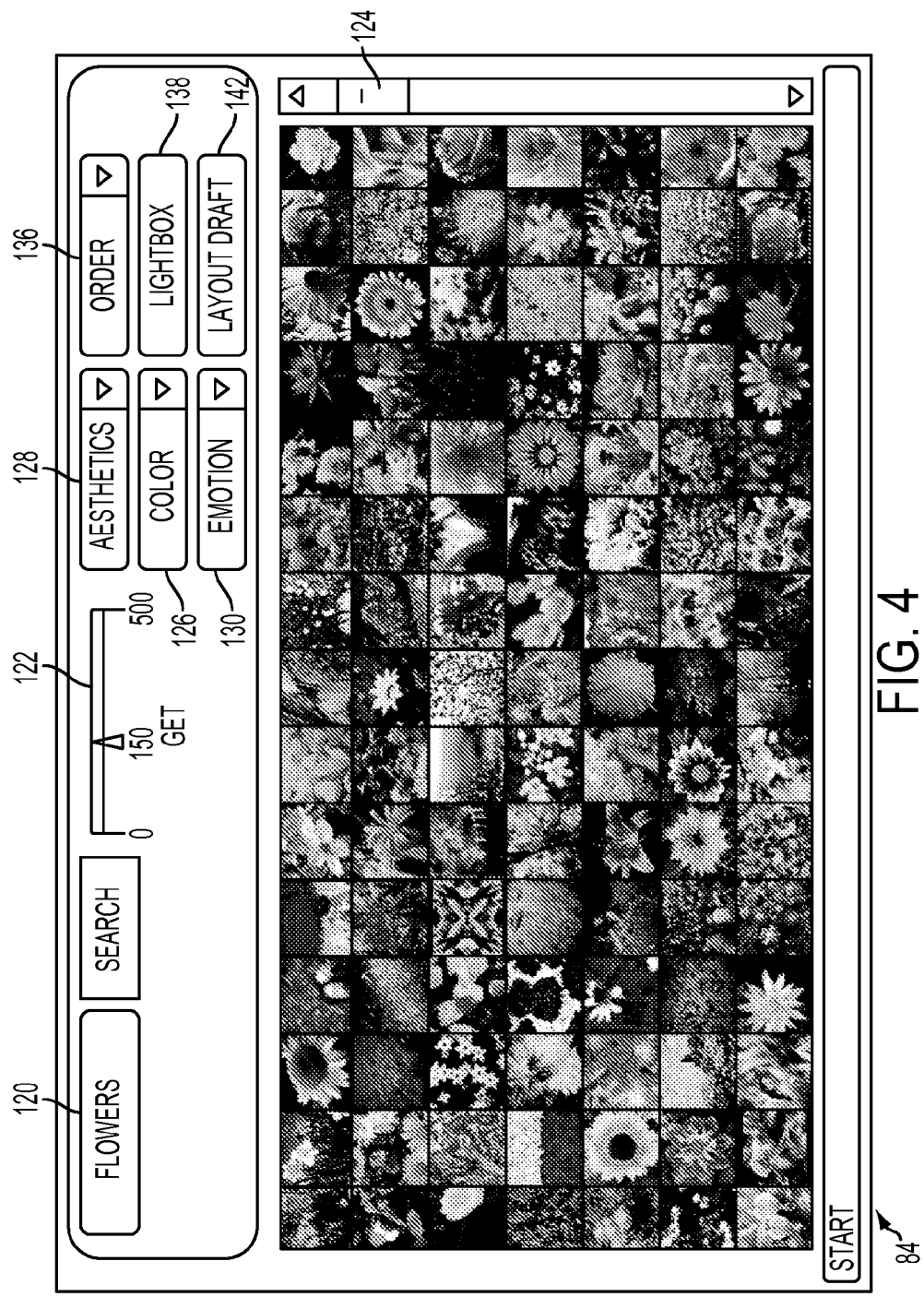
FIG. 4 is a screen shot of an exemplary graphical user interface of the apparatus of FIG. 2, displaying images responsive to a content-based query.

At S108 (Search Space Creation), based on the user's content selection, a search space is created and may be displayed, as shown in the screenshot 84 in FIG. 4. All the images which are retrieved may be displayed at this time.

At S110, provision is made for the user 30 to select certain ones of the selectable aesthetic/emotional features and the user's aesthetic and/or emotion feature selections are received via the GUI 70. As will be appreciated, the selection of content, aesthetic, and/or emotion features can proceed in any order.

At S112, based on the user's content, aesthetic and/or emotional feature selection(s), the search space is partitioned whereby images are grouped. The images may be processed and grouped using a set of software tools, such as K-means, and the like, to create visually coherent search spaces. Grouping of the images can be performed using K-means clustering or partitioning of the space according to the features selected by the user, as described below.

At S114 (Visualization), the search space created by the user through feature selection is visualized. Different modalities (e.g., clusters, mosaics, or other types of group) may be available for visualizing the search space. In the exemplary embodiment, in the visualization stage, a two dimensional array of n=9 image groups 92, 94, 96 (an empty group), 98, 100, 102, 104, 106, and 108 is created for two selected features, as illustrated in the screenshot 86 in FIG. 5. As will be appreciated, the number n of groups into which the retrieved images are partitioned and displayed can be any suitable number, such as 4, 6, 8, 9, 10, 12, or more. For larger number of groups, the groups can be cascaded, the user clicking on or otherwise selecting a selected set of groups for review. Each group may be visually separated from the other groups, e.g., by placement of the groups in different areas of the screen and/or by providing visual borders 87 between the groups. In one embodiment, the groups may simply be clustered in an array, without the borders between groups being made apparent, but generally preserving the order of each of the feature levels in mutually perpendicular directions. When more than two features are selected, other methods of allowing a user to view the groups may be more appropriate, such as a hierarchical display.

At S116, a user may select one of the clusters as containing one or more images of interest, which are then displayed on the GUI. A user can select one of the groups for closer examination, e.g., by clicking on the group of images or area in which the group of images is located. Then, the group of selected images is displayed on an area of the screen. The remaining groups may be deleted from the display.

Provision may be made for contemporaneous viewing of the document template 58, e.g., adjacent the displayed group of images, by selection of a layout draft button 142. The user can drag and drop a selected one of the displayed images into an appropriate placeholder 60 on the template as illustrated in the screenshot 88 in FIG. 6. Alternatively or additionally, selected images can be first dragged to a light box 110 and are displayed there until the user decides to drag and drop one or more of the images in the light box onto the template 58. The light box 110 can also contain any previously selected images which were saved at earlier stages.

At the user's selection, the method may return to S110, where the user may select different combinations of aesthetic/emotion features, or to S106, where a new content search may be input.

At S118, the user may wish to view images similar to one or more of those displayed in the selected group. In one embodiment, the user is able to select to have a number k of nearest neighbors retrieved from the database or to request that near duplicates be found. These neighbors/duplicates are selected from the database based on different criteria to those in the displayed group. In this way, images which are not tagged with the same content-based tag may be retrieved and displayed. For example, the nearest neighbors can be retrieved based on similarity of their color histograms. As a result, images with similar colors may be displayed, even though their content may be quite different. Near duplicates can be identified based on similarity of low or high level features to those of one or all the images in the group.

Various methods exist for identifying the K-nearest neighbor (KNN). For example, color histograms can be used. For example, the range of each of the red, green, and blue channels is quantized into 16 bins. The histogram of the image is obtained in this quantized space. The K nearest neighbors are obtained based on similarities in their histograms. Methods for identifying nearest neighbors are described, for example, in Matthieu Guillaumin, Thomas Mensink, Jakob Verbeek, and Cordelia Schmid, TagProp: Discriminative metric learning in nearest neighbor models for image auto-annotation, ICCV 2009.

At S120, once the user is satisfied with the document template, the filled template 62 is output, e.g., to a printer, display 72, or other output device, or may be stored in memory for later retrieval. In the case where a user is simply selecting an image or set of images, the image(s) may be tagged with a specific tag for later retrieval or the images may be output from the system.

The method ends at S122.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for assisting a user in navigating an image dataset.

The method illustrated in FIG. 3 may be implemented in a tangible computer program product or products that may be executed on a computer. The computer program product may be a tangible computer-readable recording medium on which a control program is recorded, such as a disk, hard drive, or the like configured for performing the method. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. The computer program product may be integral with the computer 40, (for example, an internal hard drive or RAM), or may be separate (for example, an external hard drive operatively connected with the computer 40), or may be separate and accessed via a digital data network such as a local area network (LAN) or the Internet (for example, as a redundant array of inexpensive or independent disks (RAID) or other network server storage that is indirectly accessed by the computer 40, via a digital network). Alternatively, the method may be implemented in a transmittable carrier wave in which the control program is embodied as a data signal using transmission media, such as acoustic or light waves, such as those generated during radio wave and infrared data communications, and the like.

Various aspects of the method and apparatus will now be described in greater detail.

As described above, the exemplary system 80, method, and graphical user interface 70 allow for navigating and searching of a database 10 of creative assets 54. One advantage of the system 80 over existing systems is that it allows a combination of existing content-based search techniques with aesthetic/emotional features. Users can create search spaces by selecting a specific semantic category (e.g., flowers) and by exploring images in the category iteratively using different combinations of aesthetic and/or emotional features (e.g. light, contrast, blur, color, appreciation, activity).

In the exemplary embodiment of the system 80, the features are computed off-line (i.e., prior to a user submitting a query). As an example, the following features may be used.

1. Content-Based Features

In the exemplary embodiment, the user is able to make a first search based on semantic content and subsequently browse through the retrieved imaged by different features, such as image aesthetics or emotions.

The class labels for the content-based features may include common visual object categories, such as flowers, landscapes, seascapes, sky, vehicles, people, buildings, animals, etc, and/or specific themes, such as party, wedding, sporting events, summer, winter, and the like. In one embodiment, the classes can be tailored to correspond to the particular fields of interest of the graphic designer. The number of content-based classes is not limited, but is at least 2 and may be, for example, from about 5 to 50, or more.

In general, categorization techniques based on image content may encompass a set of operations that transforms pictorial inputs into commonly understood descriptions. Automated techniques have been developed which assign keywords to an image based on its high-level content. These techniques can analyze the whole scene or focus on objects within the image. Keyword assignment may be associated with a confidence value. The image is then labeled with keywords for which the confidence value exceeds a threshold confidence value.

As one example for tagging images suitable for a text-based search, image representations, such as Fisher representations may be used by a generic visual classifier (GVC), which automatically annotates the images with predefined and pre-trained categories.

In this approach, for each of a set of patches of the image, low level image descriptors are extracted, e.g., as a features vector. For each patch, a representation (e.g., Fisher vector) may be generated, based on the extracted low level image descriptors, e.g., by concatenation. A high level representation of the image is extracted, based on the patch representations or low level image descriptors. In the exemplary embodiment, the high level representation is a vector (e.g., a Fisher vector).

In one embodiment, a visual vocabulary is built for each feature type using Gaussian Mixture Models. Modeling the visual vocabulary in the feature space with a GMM may be performed according to the method described in F. Perronnin, C. Dance, G. Csurka and M. Bressan, *Adapted Vocabularies for Generic Visual Categorization*, in ECCV (2006). While some approaches use a single visual vocabulary generally built on the whole training set, in other embodiments, performance may be improved by adapting the visual vocabulary (universal) trained on the whole training set to each category using category-specific images. An image is then characterized by a set of bipartite histograms, one per category, where each histogram describes whether the image content is best modeled by the universal vocabulary, or the corresponding category vocabulary. Such a method is described in U.S. Pub. No. 20070005356 to Perronnin, incorporated herein by reference.

Various methods exist for generation of a high level representation of an image which may be used herein, as disclosed, for example, in above-mentioned U.S. Pub. Nos. 2007/0005356; 2007/0258648; 2008/0069456; the disclosures of which are incorporated herein by reference, and G. Csurka, C. Dance, L. Fan, J. Willamowski and C. Bray, "Visual Categorization with Bags of Keypoints," ECCV workshop on Statistical Learning in Computer Vision (2004); and F. Perronnin and C. Dance, "Fisher kernel on visual vocabularies for image categorization," In *Proc of the IEEE Conf. on Computer Vision and Pattern Recognition (CVPR)*, Minneapolis, Minn., USA. (June 2007). This last reference and U.S. Pub. No. 2007/0258648 describe a Fisher kernel (FK) representation based on Fisher vectors.

Fisher vectors and Fisher Kernel representations are exemplary of types of high level representation which can be used herein. In another embodiment, a Bag-of-Visual words (BOV) representation may be used, as described in above mentioned U.S. Pub. Nos. 2008/0069456 and 2007/0005356. In the BOV based approach, the image is first characterized by a histogram of visual word counts. The visual vocabulary is built automatically from a training set of images.

The low level image descriptors which are extracted from the patches in all of these methods are typically quantitative values that summarize or characterize aspects of the respective patch, such as spatial frequency content, an average intensity, color characteristics (in the case of color images), gradient values, and/or other characteristic values. The low level image descriptors are extracted locally on regions of interest (ROI). The ROI can be obtained by image segmentation, by applying specific interest point detectors, by considering a regular grid, or by simply random sampling of image patches. In some embodiments, at least about fifty low level image descriptors are extracted from each patch; however, the number of image descriptors that can be extracted is not limited to any particular number or type of image descriptors for example, 1000 or 1 million low level image descriptors could be extracted depending on computational capabilities. In the exemplary embodiment, the low level image descriptors include local (e.g., pixel) color statistics, and/or texture. For color statistics, local RGB statistics (e.g., mean and standard deviation) may be computed. For texture, gradient orientations (representing a change in color) may be computed for each patch as a histogram (SIFT-like features). In the exemplary embodiment two (or more) types of low level image descriptors, such as color and texture, are separately extracted and the high level representation is based on a combination of two Fisher Vectors, one for each feature type. In other embodiments, Scale Invariant Feature Transform (SIFT) descriptors (as described by Lowe, in "Object Recognition From Local Scale-Invariant Features", ICCV (International Conference on Computer Vision), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 image descriptors per features vector in these embodiments). Other descriptors or feature extraction algorithms may be employed to extract low level image descriptors from the patches. Examples of some other suitable image descriptors are set forth by K. Mikolajczyk and C. Schmid, in "A Performance Evaluation Of Local Descriptors", Proceedings of the Conference on Computer Vision and Pattern Recognition (CVPR), Madison, Wis., USA, June 2003, which is incorporated in its entirety by reference.

A classifier (which may comprise a set of binary classifiers) is trained on the image representations, e.g., Fisher vectors, and the labels of the training images 56. In one embodiment, a machine learning classification method is used, such as a Support Vector Machine (SVM) classifier. In alternate embodiments, the classifier trained may be any discriminative classifier (i.e., a classifier that models class boundaries), such as Fisher kernels (FK), or neural networks. The trained classifier is then used to assign labels to unlabeled images, representing the probability of an image being in a class. Or, the classifier may assign a binary yes/no label generated by thresholding the probability value.

The content-based tagging of images is not limited to these methods. Other methods of content-based tagging are described, for example in Matthieu Guillaumin, Thomas Mensink, Jakob Verbeek, and Cordelia Schmid, TagProp: Discriminative metric learning in nearest neighbor models for image auto-annotation, ICCV 2009; Ondrej Chum, Michal Perdoch and Jiri Matas, Geometric min-Hashing: Finding a Thick Needle in a Haystack, CVPR 2009; Herve Jegou and Matthijs Douze and Cordelia Schmid, Hamming embedding and weak geometric consistency for large scale image search, ECCV 2008; and Jorma Laaksonen, Markus Koskela, and Erkki Oja, PicSOM self-organizing image retrieval with MPEG-7 content descriptions," IEEE Transactions on Neural Networks, vol. 13, no. 4, 2002.

While in the exemplary embodiment, content-based tagging is performed prior to the user inputting a query, it is also contemplated that the user may select a group of images, e.g., from an online database, to make up the dataset after inputting the text query. In which case, content-based tagging of images according to category may be performed after the text query is input.

2. Emotion and Aesthetic Features

For each of the other features, the dataset 10 of images may be quantized, i.e., assigned to one of a set of partitions, the partitions covering the range of values for that feature. The partitions for a given feature may each contain an equal number of images or the feature space may be otherwise partitioned according to feature values. For example, for a color feature "red", all the images in the collection are assigned a redness value, based on, for example the average pixel red hue (in an RGB color space). The images with the highest redness score are assigned to a first level, the next set, to a second level, and so forth, depending on the number of quantization levels among which the images are partitioned. The number of quantization levels can vary from one feature to another, or be the same for all features. Quantization levels of about 2 to 10 per feature, e.g., at least 3, may be usefully employed, depending on the number of images in the dataset and the number of selectable features. For example, for a two dimensional array, having 3 quantization levels in each dimension allows a 3×3 array to be generated (nine groups) when two features are selected.

In the exemplary embodiment, emotional and aesthetic features are determined directly from image data, without the need for learning emotional or aesthetic concept classifiers. These concepts can be highly subjective and difficult to learn. Making a strong decision on tagging an image with such concepts has limitations. Therefore, instead of tagging, in the exemplary embodiment, the emotional or aesthetic concepts are considered as high level features (i.e., are based on low level features extracted from the images themselves). Scores are assigned to the images based on these high level features, which can then be quantized.

The exemplary method provides the flexibility to search by different combinations of these features without the need for high accuracy in aesthetic or emotional categorization, or the need for combining different aspects into a single image value.

2A. Aesthetic Features

Examples of aesthetic features which may be used include brightness, contrast, blur, hue, image dimension, and the like. A group of features may be first selectable by type. For example, for the overall feature type "color", selectable features may include red, blue, green, etc. Various methods exist for quantizing feature values of images which can be initially based on an analysis of pixel colorant values. See, for example, U.S. Pub. No. 2006/0164664, entitled COLOR QUANTIZATION AND METHOD THEREOF AND SEARCHING METHOD USING THE SAME, by Lee, et al., the disclosure of which is incorporated herein by reference in its entirety.

Techniques for determining aesthetic features are described, for example, in U.S. Pat. Nos. 5,357,352, 5,363,209, 5,371,615, 5,414,538, 5,450,217; 5,450,502, 5,802,214, 5,347,374, and 7,031,534, and may include generating statistics such as noise measures or luminance and chrominance distributions on a low resolution version of the image. U.S. Pat. No. 5,414,538, for example, incorporated herein by reference, discloses receiving the input image defined in terms of red-green-blue (RGB) signals, converting the RGB signals to corresponding luminance-chrominance signals including at least one signal that represents overall image intensity, and comparing the intensity signal to upper and lower intensity threshold signals that define the acceptable levels of brightness and darkness in the image.

Brightness refers to the luminance of an image. It is the average of the brightness values of all the pixels in an image. Each brightness value can be computed by calculating the gray value from the RGB of a pixel, or converting the RGB of a pixel to a luminance color space, such as HSV, where the V value is the brightness.

Contrast refers to the efficient use of the dynamic range. (See for example, U.S. Pat. No. 5,363,209 to Eschbach, et al., for a discussion of methods to determine local contrast from luminance-chrominance values, which can be quantized into a number, L of quantization levels). Contrast can be determined by computing a combined histogram of the red, green, and blue channels of the image, by summing the individual histograms. The contrast is taken to be the width of the middle 98% mass of the histogram. See, for example, Yan Ke, Xiaoou Tang, and Feng Jing, The Design of High-Level Features for Photo Quality Assessment, CVPR06 (Ke, et al.).

Saturation refers to the vividness of colored objects in an image. A color with more gray is considered less saturated, while a bright color, one with very little gray in it, is considered highly saturated. The saturation of a color can affect the emotional reaction to an image. The system may detect color saturation values in HSV space, as described, for example, in U.S. Pat. No. 5,450,217 and provide a quantized average saturation value for each image.

Image Blur is a form of bandwidth reduction typically caused by relative motion between the camera and the original scene or by an optical system that is out of focus. It can be computed by smoothing an image with a Gaussian filter to obtain the blurred image. The blur is proportional to the maximum frequency of an image, which is obtained by thresholding the two dimensional Fourier transform of the blurred image. See, for example, Ke, et al.

Hue refers to the first characteristic of a color that the eye detects. It is taken to be the H value in the HSV color space representation of a pixel after converting the RGB value of a pixel to HSV.

Image dimension refers to the number of pixels in an image. It is computed by multiplying the width in pixels by the height in pixels of an image.

Other methods for assigning aesthetic values to images may be based on classifier learning techniques, for example, by training a classifier on images labeled by people as attractive or not attractive could be used to assign aesthetic values to images. See, for example, Elena Fedorovskaya, Carman Neustaedter and Wei Hao, IMAGE HARMONY FOR CONSUMER IMAGES, ICIP 2008; B. C. Davis and S. Lazebnik, ANALYSIS OF HUMAN ATTRACTIVENESS USING MANIFOLD KERNEL REGRESSION, ICIP 2008; Ritendra Datta, Dhiraj Joshi, Jia Li and James Z. Wang, Studying Aesthetics in Photographic Images Using a Computational Approach, ECCV 2006. However, in general, such methods are not needed as relatively simple, statistics-based features are adequate for generating a useful feature space.

Exposure refers to the amount of light falling on the camera sensor while the photograph is captured. It is taken to be the same as the brightness Other features are contemplated, such as image dynamics, perspective, and composition.

2B. Emotion Features

Examples of emotion features include appreciation and activity (See, for example, Omnia report L4.2, Kiryl Bletsko, Amel Ezzaich, Emmanuel Dellandréa, Alexandre Saidi, Liming Chen, Classification de documents multimedia, Livrable Omnia 4.2, e.g., Annexes, beginning on page 21).

In one embodiment, the relationship between color and emotion is exploited, allowing images to be quantized according to various emotion features based on their predominant colors (see, for example, L. C. Ou, M. R. Luo, A. Woodcock, and A. Wright, A study of colour emotion and colour preference, in COLOR research and application. 29 (2004) pp. 232-240; M. Solli and R. Lenz, Emotional Satisfaction in Color Image Retrieval, in Proc. Swedish Symposium on Image Analysis 2008; and M. Solli and R. Lenz, Color Emotions for Image Classification and Retrieval, in CGIV 2008).

In another embodiment, facial expressions of any people of the images may be identified and quantized according to various emotion features, such as happy/unhappy angry/calm, etc. (See, e.g., B. Fasel, J. Luettin, Automatic Facial Expression analysis: a survey, Pattern Recognition, vol. 36, pp. 259-275, 2003; M. Pantic, L. J. M Rothkrantz, Expert system for automatic analysis of facial expressions, ELSEVIER Image and Vision Computing, vol. 18, pp. 881-905, 2000).

In another embodiment (e.g., using the Tellegen-Watson-Clark model), a separate classifier model is trained for each of a plurality of emotion features, each feature representing a pair of opposing emotions (pleasantness-unpleasantness, engagement-disengagement, etc.), using tags of the labeled dataset and descriptors extracted from the images. The trained classifiers can output a score to each image for each feature which can used to group the images, e.g., assigning quantized values or a ranking to the images in the dataset for each of the features.

In other methods, classical low level features (color, Gabor features, SIFT features) can be used to predict emotions from manually annotated data.

Visualization

Based on the assigned content, aesthetic, and emotional features, the user can create search spaces by selecting single features or combinations of features. The number of groups of images displayed depends on the quantization levels for each feature selected and the number of features selected.

A typical search workflow may involve:

1. The creation of a search space using one or more features (e.g., content, content+aesthetics, etc). (S108)

2. Rough re-organization of the search space based on other features to achieve a better visual coherence. (S112)

3. Targeted exploration of the search space through near-duplicates or nearest neighbor visualization (S118).

To facilitate the browsing process, the exemplary system 80 allows feature combination refinements of the search space (e.g., of the results of a textual search query) in different combinations and in different numbers. For example, if a user is searching for an image of a blue sky which projects a positive feeling onto the viewer, selecting the text query "sky" together with the two features "blue" and "appreciation" would retrieve sky images and display them in a visually coherent manner. Additionally, the exemplary user interface facilitates not only a creative asset navigation, but also aids visual content creation by allowing a "combined" visualization of a working draft document (eventually containing image placeholders) with alternatively selected images.

Without intending to limit the scope of the exemplary embodiment, the following example describes one use of the system 80 for creation of a document.

Example

With reference to FIG. 4, the images in the dataset 10 may be presented in a compact visualization allowing up to 350 thumbnail images (which may be reduced pixel resolution and/or cropped images generated from the stored images in the database) to be presented in the same page. The user may first enter a text query by entering a keyword in the search box 120 or selecting one from a menu, such as a drop down menu displayed on the GUI. A content search space is then generated. For example, as shown in FIG. 4, the user can enter a search query (e.g., "flowers") in the text entry box 120 and can select how many images to retrieve (e.g., 150 images) using a selector 122. If the classifiers are probabilistic, the system 80 retrieves the 150 images with the highest assigned probabilities of being images of flowers and displays them on the GUI display 72. For example, FIG. 4 shows part of the subset of images obtained with the text query "flower."

The user can use a scroll bar 124 to scroll down the entire set of retrieved images, e.g., if the number retrieved is more than can be readily viewable on the display at one time.

To refine the query, the user can select among the aesthetic and emotional features by actuating one or more of a plurality of features selectors 126, 128, 130. The user may decide, for example, to group images using a red color feature and may select the red color feature using the color feature selector 126. Groups of images sorted in one-dimension by the red color feature in decreasing order from more red to less red are contemporaneously displayed on the GUI, e.g., from left to right and/or top to bottom. In the exemplary embodiment, six groups are contemporaneously displayed in an array.

The user may then decide to add a second feature, such as another aesthetic feature and selects, for example, a brightness feature using the aesthetic feature selector 128. Groups of images sorted in two-dimensions: horizontally by the brightness aesthetic feature F1 and vertically by the red color feature F2, and are displayed contemporaneously on the GUI display 72, as shown in the screenshot 86 in FIG. 5. The quantization level of feature F1 may be reduced automatically to maintain a suitable number of displayed groups when feature F2 is also selected. For example, if there are six quantization levels for the first feature with which images in the database are labeled, pairs of adjacent quantization levels may be combined to produce three quantization levels.

Figure 5:
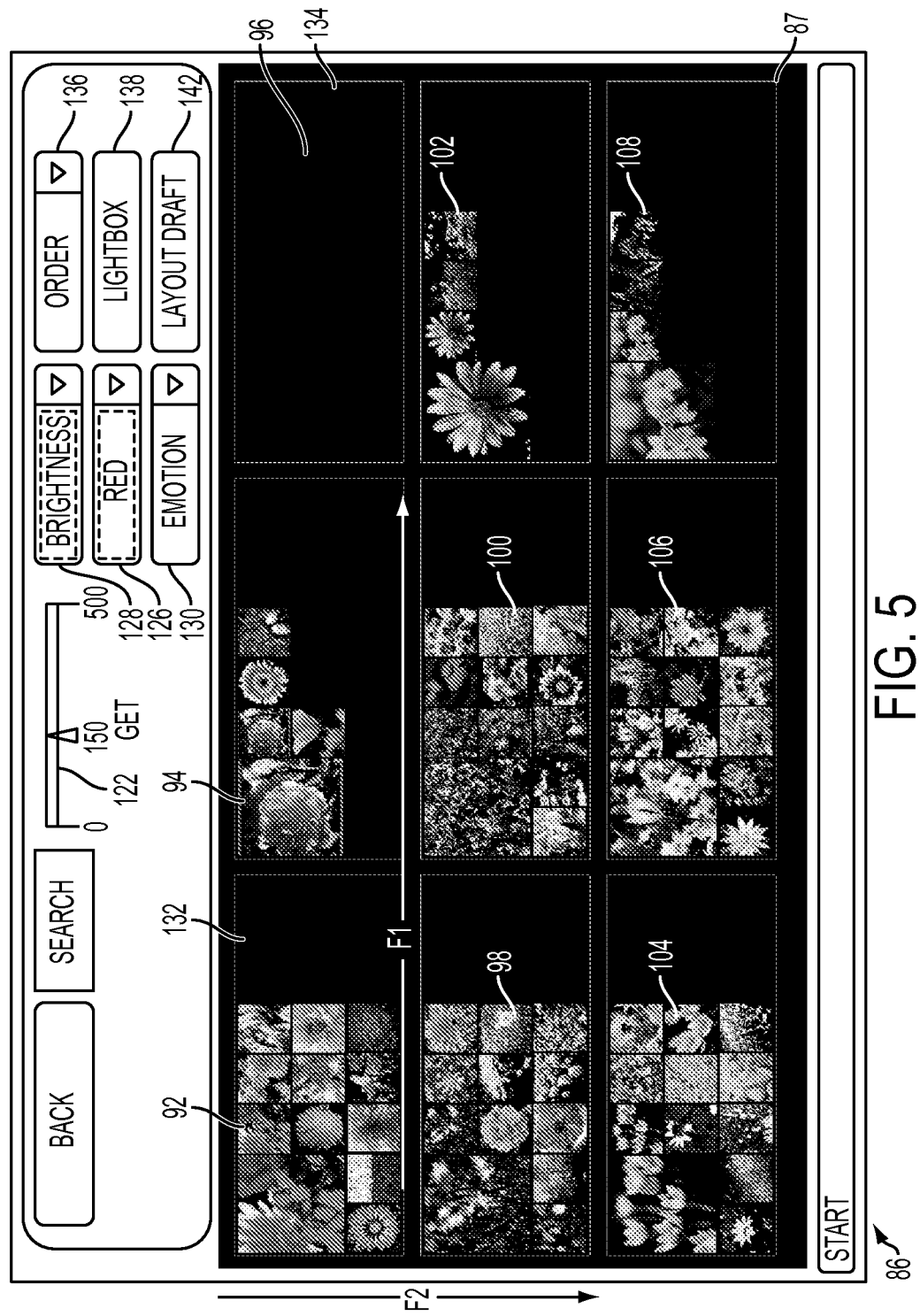
FIG. 5 is a screen shot of the graphical user interface of the apparatus of FIG. 2, displaying images in a two dimensional array following a selection of two features F1, F2 on which to partition the images.

As will be evident from FIG. 5, each area of the display shows a different group of images, each group corresponding to a different combination of quantization levels of the first and second features selected. Images which fall within the quantization levels of the selected features are thus displayed in the appropriate area of the display. In the exemplary array, the order decreases according to the feature values from left to right and from top to bottom, i.e., the most red and bright image is in the top-left group 92 and the least red and bright image is in the bottom-right group 108. For example, the area 132 at the top left of the display includes those images in quantization level 1 for red and 1 for brightness (i.e., high red and high brightness). Not all the areas have images in them. For example, area 134 is empty because there are no images in the category "flower" in the database 10 which are in quantization level 3 for feature "brightness" and quantization level 1 for feature "red." As with the images displayed in FIG. 4, the groups of images can be separately scrolled if there are too many in a group to be displayed at the same time.

In the exemplary embodiment, a maximum of one color feature can be selected (such as one of red, green, and blue) at any one time. For the second feature, either another aesthetic feature or an emotion feature can be selected.

A third feature could then be selected, e.g., using the emotions feature selector 130, generating a three dimensional array or suitable two-dimensional representation thereof. Alternatively, the user may decide to change one or both of the first and second features to change the two dimensional display.

Rather than having the groups of images shown separated, the user can request that the groups simply be ordered in a manner which reflects the features selected (for example, the most red images are clustered in a group at the top left of an array and the least bright are clustered in a group at the bottom right and the borders between the groups are not displayed). The user can click on the order selector 136 to have the images displayed in this way. As will be appreciated, the images can be readily grouped and ordered by various combinations of features (e.g., "redness" and "contrast").

Figure 6:
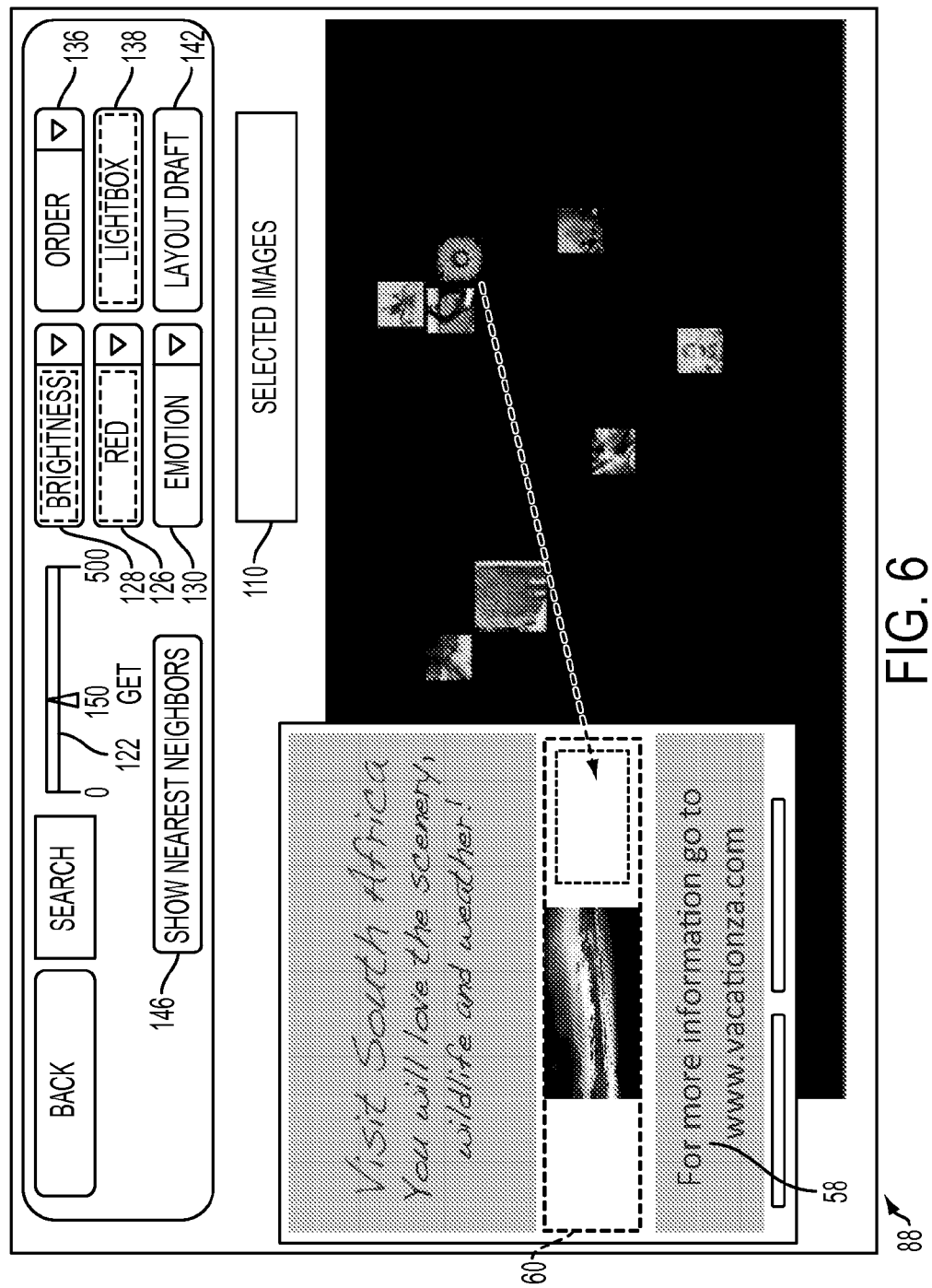
FIG. 6 is a screen shot of the graphical user interface of the apparatus of FIG. 2 showing a set of images from one of the partitions of the array of FIG. 5, adjacent a template to be filled in with selected ones of the images.

The user may then decide that images in one of the displayed groups 92 have the appropriate color and brightness for a particular document and may click on that group which is then displayed on the display. The user may click on the light box icon 138 to bring up a light box 110 into which selected ones of the selected image(s) can be dragged as candidate images for final selection. The user can click on a layout draft selector button 142 which provides access to the document 58 to be displayed on the display (FIG. 6). As shown in the screen shot 88, the selected group of images, light box 110, and the document template 58 are displayed contemporaneously. The user can select to have nearest neighbors or almost duplicate images displayed by clicking on a nearest neighbor/duplicates selector (not shown). Alternatively, the nearest neighbors/close duplicates may be retrieved by clicking on a selected one of the images.

The user may drag and drop a selected one of the images onto the document 58 (e.g., from the light box 110) to see if the image meets the design needs. The selected image 54 is added to the document template 58, which contains any previously selected images which were saved at earlier stages. After repeating this process one or more times to find more images, the user may click on the layout draft selector 142 to confirm the completion of the filled document 62, as shown in FIGS. 2 and 6.

The system provides graphic designers with an interface to navigate through a very large image database guided by selected aesthetic, color, and/or emotion features. Imaging scientists can use the system for a quick, visual or qualitative test of the efficacy of their designed visual features through facilitated observation of large numbers of retrieved images.

In contrast to existing search methods which rely on textual search queries, the present system allows refining the search by parameterizing the query. For example, the user can set the level of brightness and/or of redness. Also, the visual coherence of the results is high and the search space exploration is very easy-the user can simply select the group which appears most likely to have images of interest and scroll through thumbnails of the images in the group or fill the display with the selected group of images. When the user is interested in a specific thumbnail, the corresponding image is displayed as well as its nearest neighbor images.

The exemplary navigation system has various applications. For example, it provides graphic designers with an interface to navigate through a very large image database guided by selected aesthetic, color, and emotion features. Imaging scientists can also make use of the system, for example, it enables a quick, visual or qualitative test of the efficacy of designed visual features through observation of large numbers of retrieved images.

Applications of the exemplary system and method include 1 to 1 personalization and direct mail marketing. Multimedia rich document creation poses various challenges to the assurance of a proper aesthetical level due to the portion of content they include. The exemplary system satisfies the need for selection of appropriate assets in a database of creative images. Enterprise marketing data printing is not the only application of the system and method. Other applications, such as image and document asset management or document image/photograph set visualization, and the like can also profit from it.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for assisting a user in navigation of an image dataset comprising:
    training a separate classifier for each of a plurality of emotional features, each emotional feature representing a pair of opposing emotions, using labels of labeled images and descriptors extracted from the labeled images;
    receiving a user's text query;
    retrieving images responsive to the text query from a dataset of images, the images in the dataset being associated with emotional features output by the trained classifiers;
    providing for receiving the user's selection of a first feature selected from a set of available features, the set of features including the emotional features and aesthetic features;
    providing for receiving the user's selection of a second feature selected from the set of available features; and
    displaying at least some of the retrieved images on the graphical user interface contemporaneously in an arrangement, whereby the arrangement of images reflects different levels of the first feature where only a first feature is selected and reflects different combinations of levels of the user-selected first and second features where first and second features are selected, the emotional features each including at least three levels,
    wherein when first and second features are selected, the displaying includes displaying images in a two-dimensional array on the graphical user interface, wherein the first feature increases in level in a first dimension of the two dimensional array and the second feature increases in level in a second dimension of the two dimensional array, whereby positions of images in the array reflect respective combinations of feature levels.

2. The method of claim 1, wherein the displaying includes displaying at least some of the retrieved images on the graphical user interface contemporaneously in groups, whereby each displayed group of images corresponds to a different combination of levels of user-selected first and second features.

3. The method of claim 1, further comprising displaying, on the graphical user interface, a first selector for selection of the first feature from a first set of features and a second selector for selecting the second feature from a second set of features.

4. The method of claim 3, wherein the first features are aesthetic features and the second features are emotional features.

5. The method of claim 3, further comprising providing for a user to select a third feature from a third set of features, whereby the displayed images are grouped according to the selected at least two of the first, second, and third features.

6. The method of claim 2, wherein the displayed groups of images are ordered according to values of the selected features.

7. The method of claim 2, wherein each group of images in the display differs in a combination of quantized values of the first and second features from each of the other groups.

8. The method of claim 1, wherein for each feature in the set of features, a plurality of quantization levels corresponding to different values of the feature is provided and each of the images in the dataset of images is associated with a respective one of the quantization levels for each of the features.

9. The method of claim 8, wherein for each feature in the set of features, there are at least three quantization levels.

10. The method of claim 1, wherein the providing for receiving the user's selections of the first and second features includes providing for receiving the user's selections via the graphical user interface.

11. The method of claim 1, further comprising retrieving at least one of nearest neighbors and near duplicate images for a user-selected image or user-selected group of images and displaying the at least one of nearest neighbors and near duplicate images on the graphical user interface.

12. The method of claim 1, wherein the images comprise photographs.

13. The method of claim 1, further comprising automatically classifying at least a portion of the images in the dataset according to content, and wherein the retrieving of images responsive to a text query is based on the content classifications of the images.

14. The method of claim 1, further comprising displaying a document with a placeholder for accepting an image contemporaneously with a user-selected group of the images, whereby a user can select an image from the displayed group to be inserted in the placeholder.

15. The method of claim 1, wherein the displayed images are thumbnail images derived from corresponding images in the stored dataset.

16. The method of claim 1, wherein at least one of the first and second features is a color feature and the other of the first and second features is an emotion feature.

17. A computer program product comprising a non-transitory medium encoding instructions, which when executed by a computer, perform a method for assisting a user in navigation of an image dataset, the method comprising:
    training a separate classifier for each of a plurality of emotional features, each emotional feature representing a pair of opposing emotions, using labels of labeled images and descriptors extracted from the labeled images;
    receiving a user's text query;

retrieving images responsive to the text query from a dataset of images, the images in the dataset being associated with emotional features output by the trained classifiers;

providing for receiving the user's selection of a first feature selected from a set of available features, the set of features including the emotional features and aesthetic features;

providing for receiving the user's selection of a second feature selected from the set of available features; and displaying at least some of the retrieved images on the graphical user interface contemporaneously in an arrangement, whereby the arrangement of images reflects different levels of the first feature where only a first feature is selected and reflects different combinations of levels of the user-selected first and second features where first and second features are selected, the emotional features each including at least three levels, wherein when first and second features are selected, the displaying includes displaying images in a two-dimensional array on the graphical user interface, wherein the first feature increases in level in a first dimension of the two dimensional array and the second feature increases in level in a second dimension of the two dimensional array, whereby positions of images in the array reflect respective combinations of feature levels.

18. A navigation system for assisting a user in navigation of an image dataset comprising:

memory which stores instructions for:

training a separate classifier for each of a plurality of emotional features, each emotional feature representing a pair of opposing emotions, using labels of labeled images and descriptors extracted from the labeled images, receiving a user's text query, retrieving images responsive to the text query from a dataset of images, the images in the dataset being associated with emotional features output by the trained classifiers, providing for receiving the user's selection of a first feature selected from a set of available features, the set of features including the emotional features and aesthetic features, providing for receiving the user's selection of a second feature selected from the set of available features, and displaying at least some of the retrieved images on the graphical user interface contemporaneously in an arrangement, whereby the arrangement of images reflects different levels of the first feature where only a first feature is selected and reflects different combinations of levels of the user-selected first and second features where first and second features are selected, the emotional features each including at least three levels, wherein when first and second features are selected, the displaying includes displaying images in a two-dimensional array on the graphical user interface, wherein the first feature increases in level in a first dimension of the two dimensional array and the second feature increases in level in a second dimension of the two dimensional array, whereby positions of images in the array reflect respective combinations of feature levels; and a processor in communication with the memory for executing the instructions.

* * * * *